(12) United States Patent
Welch

(10) Patent No.: US 7,606,735 B1
(45) Date of Patent: Oct. 20, 2009

(54) METHOD OF PROVIDING AUDIO FORMAT PROFESSIONAL INFORMATION UPDATE SERVICE FOR PAYMENT, VIA INTERNET

(76) Inventor: James D. Welch, 10328 Pinehurst Ave., Omaha, NE (US) 68124

( * ) Notice: Subject to any disclaimer, the term of this patent is extended or adjusted under 35 U.S.C. 154(b) by 955 days.

(21) Appl. No.: 10/796,162

(22) Filed: Mar. 9, 2004

Related U.S. Application Data

(63) Continuation-in-part of application No. 09/685,044, filed on Oct. 10, 2000, now abandoned.

(60) Provisional application No. 60/198,157, filed on Apr. 17, 2000, provisional application No. 60/201,000, filed on May 1, 2000.

(51) Int. Cl.
*G06Q 30/00* (2006.01)

(52) U.S. Cl. .......................... 705/26; 705/27

(58) Field of Classification Search .................. 705/26, 705/27
See application file for complete search history.

(56) References Cited

U.S. PATENT DOCUMENTS

| 5,732,216 | A | 3/1998 | Logan et al. ........... 395/200.33 |
| 5,793,762 | A | 8/1998 | Penners et al. .............. 370/389 |
| 5,793,980 | A | 8/1998 | Glasser et al. ......... 395/200.61 |
| 5,794,207 | A | 8/1998 | Walker et al. .................. 705/23 |
| 5,797,127 | A | 8/1998 | Walker et al. .................. 705/5 |
| 5,819,032 | A | 10/1998 | De Vries et al. .......... 395/210.8 |
| 5,825,863 | A | 10/1998 | Walker ........................ 379/144 |
| 5,884,324 | A | 3/1999 | Cheng et al. ................. 701/201 |
| 5,897,620 | A | 4/1999 | Walker et al. ................... 705/5 |
| 5,926,624 | A | * 7/1999 | Katz et al. ................... 709/217 |
| 5,926,796 | A | 7/1999 | Walker et al. ................. 705/16 |
| 5,943,422 | A | 8/1999 | Van Wie et al. ................ 380/9 |
| 5,956,697 | A | 9/1999 | Usui ........................... 705/32 |
| 5,956,716 | A | 9/1999 | Kenner et al. ................. 707/10 |
| 6,018,767 | A | 1/2000 | Fijolek et al. ............... 709/218 |
| 6,049,829 | A | 4/2000 | Li .............................. 709/229 |
| 6,170,014 | B1 | * 1/2001 | Darago et al. .............. 709/229 |
| 6,325,632 | B1 | 12/2001 | Chao et al. .................. 434/322 |
| 6,546,230 | B1 | 4/2003 | Allison ....................... 434/350 |

OTHER PUBLICATIONS

Lawcast: "Getting an earful of law on cassette legal journals can pile up, unread. N. J. lawyers find Lawcast helps them keep up," Philadelphia Inquirer, Apr. 7, 1995, Dialog file 633 #08098076, 4pgs.*
Lawcast: "Vox Juris expands lawcast audio legal news service," Legal Publisher, Apr. 30, 1995, Dialog file 636 #02712417, 2pgs.*

(Continued)

*Primary Examiner*—Robert M. Pond
(74) *Attorney, Agent, or Firm*—James D. Welch

(57) ABSTRACT

Disclosed is a method of providing continuing education for keeping professionals aware and informed of developments in easily accessed categorized topical areas of interest on a for-payment basis, utilizing the Internet primarily as an audio format distribution means. The method can include a client providing attestation of access and listened-to-grasping of the information over the internet, the client making permanent library copies, and the client accessing information utilizing time and/or topic tags.

10 Claims, 3 Drawing Sheets

OTHER PUBLICATIONS

Audible.com: Olson, Catherine; "Audible Inc. capitalizes on providing content on the net," Billboard, Nov. 28, 1998, v110i48pg51; Proquest #36340810, 3pgs.*

Audible.com: Internet Wayback Machine, www.archive.org; www.audible.com; Jan. 18, 1998; 12pgs.*

PRN; "Broadcast.com and Audible announce partnership," PR Newswire, Aug. 17, 1998, Proquest #33162901, 3pgs.*

BW: "Lawline.com,offering continuing legal education," Business Wire, May 26, 1999, Proquest #41887583, 2pgs.*

UU: Sabludowski, Stephen; "Education at your fingertips courses online can save all types of students both time and money," Times-Picayune, Feb. 11, 1999, Proquest #38882164, 4pgs.*

W: Boyers, Karla; "Reach out and touch someone," Association Management, Jun. 1996, v48i6pg41, Proquest #9720477, 9pgs.*

WW: Rosenblum, Trudi; "Downloading audio from the Internet:the future of audio?" Publishers Weekly, Mar. 2, 1998, v245i9pg27, Proquest #27035250, 4pgs.*

* cited by examiner

METHOD OF PROVIDING AUDIO FORMAT PROFESSIONAL INFORMATION UPDATE SERVICE FOR PAYMENT, VIA INTERNET

This Application is a CIP of application Ser. No. 09/685,044 Filed Oct. 10, 2000 now abandoned, and Claims Benefit of Provisional Application Ser. No. 60/198,157 and 60/201,000 Filed Apr. 17, 2000 and May 1, 2000 respectively.

TECHNICAL AREA

The present invention relates to methods of distributing programming over the internet, and more particularly to a method of providing continuing education for keeping professionals aware and informed of developments in easily accessed topically categorized areas of interest on a for-payment basis, utilizing the Internet primarily as an audio format distribution means. Client affirmation that accessed information was listened-to-grasped, or a completed questionnaire, (or results thereof), provided by the information provider or Professional Licensing Body can be sent via the internet by the client to the information provider and/or Professional Licensing Body, following his or her identification of, payment for, receipt of and listened-to-grasping of accessed audio format professional updated information.

BACKGROUND

Utility application Ser. No. 09/685,044 and Provisional Application Ser. No. 60/198,157 and 60/201,000 Filed Apr. 17, 2000 and May 1, 2000 respectively, are included by reference here within.

Any Professional in science, medicine and/or law and the like, knows that there is not enough time available to read the large amount of literature he or she should read to stay current in his or her area, let alone related and other areas of interest. An alternative to reading, which many people find enjoyable and beneficial, is to listen to audio presentation of materials which are prepared to consicely deliver information. Audio books, for instance, provide people a concentrated presentation of books while allowing them to do other things, simultaneous with listening. A convenient source of audio format presentation of professional continuing education information which is prepared to keep professional who listen current, would therefore provide utility.

Continuing, in view of the decision in *State Street Bank & Trust v. Signature Financial Group Inc.*, No. 96-1327 (Fed. Cir. Jul. 23, 1998), the U.S. Patent Office now grants Patents for Business methods.

With the present invention in mind, a Search of Patents has been conducted and has provided a Patent to Allison, U.S. Pat. No. 6,546,230, which describes a method for assessing the skills of medical professionals and involves a medical professional accessing a competency test over a network link. Based on the results of the test a medical professional is provided a list of courses over the network link which might or might not be available over the network. As the courses are not necessarily available over the network, repeated accessing of updated versions thereof over said network is not obviated. Neither does Allison describe updating the competency tests. Importantly it is noted that the Allison U.S. Pat. No. 6,546,230 is focused on providing Competency Tests to Health Care Professionals to determine Professional Deficiencies. If a Health Care Professional passes an accessed Competency test no Courses are suggested to him or her, hence, the Health Care Professional is not made aware of Courses via the Allison methodology. If, however, a Deficiency is identified by the Allison Competency testing, a listing of Courses is made available to the Health Care Professional under the Allison Methodology, which Courses are prepared to provide information aimed at correcting the specifically identified deficiencies, and which might or might not be available over the internet. (Note, the Claims herein require that the Audio Format professional continuing education information be accessed via the information provider internet web site). Under Allison, if a Health Care Provider then takes an identified Course to maintain Professional Competency Requirements, a Record of it is added to a list of his or her Completed Courses and that serves to indicate the overcoming of a detected Deficiency. Nothing in Allison suggests that the Competency Test be deleted or that Courses should be periodically updated and reaccessed a number of times by the Client to keep him or her aware and informed of developments in a topical area. Further, while the Allison 230 Patent indicates that Courses can be available in various formats, nothing therein states that Audio Format courses are provided On-Line and updated periodically, and that in the absence of deficiency identifying Competency testing as a guide that a category of professional continuing education information should be accessed even once, (let alone a number of times by a Client, with the information in the course being updated at least once between at least two accessings thereof).

The Allison 230 Patent is simply not directed to providing audio format professional continuing education which is prepared by an information provider to keep said client current, (aware and informed of developments), in a topical category selected and received by a Client in return for payment. The Allison 230 Patent is directed to providing Course information from any available source, (not necessarily On-line), which is prepared by the provider thereof to train a client to overcome a specific documented professional competency deficiency which is identified by a Competency test administered as part of the Allison Method.

A Patent to Chao et al., U.S. Pat. No. 6,325,632, is disclosed because it describes a computer-aided learning method and systems for matching students with instructors.

Patents to Walker et al., (of Walker Digital), include U.S. Pat. Nos. 5,794,207 and 5,926,796. Said 207 Patent to Walker et al. is focused on bilateral buyer-driven commerce, but is cited primarily as it is very enlightening regarding the Internet and regarding basic Contract and U.C.C. Law etc. The 796 Patent to Walker et al. is cited as it describes a system and method for facilitating sale and distribution of retail subscriptions to periodicals. The 207 and 796 Patents are incorporated hereinto by reference as regards background information.

Additional known Patents to Walker et al. are U.S. Pat. Nos. 5,797,127, 5,897,620 and 5,825,863, the first two of which focus on pricing and selling etc. of airline tickets, and the later of which focuses on prepaid limited usage calling cards.

Other Patents identified are:

U.S. Pat. No. 5,793,980 to Glasser et al., which describes an Audio-On-Demand Communication System which focuses on providing access to audio, such as news or music, or having a book read over the internet. The invention is focused on a system and method for sending a data stream at a rate controlled by acknowledgement markers sent from a receiving computer, which acknowledgement markers control data flow to said receiver.

U.S. Pat. No. 5,732,216 to Logan et al., describes an audio message exchange system and method in which a listener can input audio format data.

U.S. Pat. No. 5,793,762 to Penners et al., describes a system and method for providing packet data and voice services to mobile subscribers.

U.S. Pat. No. 5,819,032 to deVires, describes an electronically distributed magazine which provides for a reader thereof to submit comment relating to an article therein.

U.S. Pat. No. 5,884,324 to Cheng et al., describes a method and system for receiving a subscription message from Client computer wherein the subscription message specifies a remote data base table and replication period.

U.S. Pat. No. 5,956,697 to Usui describes a timer-based fee-charging Internet system which provides an authentication server to confirm if a subscriber should be allowed to gain access.

U.S. Pat. No. 5,956,716 to Kenner et al., describes a system and method for delivery of video clips, optionally accompanied by audio.

U.S. Pat. No. 6,049,829 to Li describes an information access system and method in which factors such as proximity, speed, server capacity, server loading, backbone and access network bandwidths and placement and access mechanisms of servers are considered regarding ease of acquiring information.

U.S. Pat. Nos. 6,018,767 to Fijolek et al., and 5,943,422 to Van Wie et al. are also disclosed as they were turned-up in a Search effort, although not felt to be particularly relevant.

It is further known that there are various available services known which available which enable clients to, for instance, access audio programming such as from radio stations anywhere in the world, and to otherwise allow access to music over the Internet.

It is also noted that a company, Vox Juris Inc. publishes updated Legal information in numerous topics under the Registered Trademark LAWCAST, and distributes updated tapes or CD's every two weeks to its subscribers via mail. The inventor herein attempted to establish a similar business starting in 1983, which would have provided real-time audio format updated professional education information via FM-subcarriers, but was never able to find funding.

What has not been found is a Patent, or combination of Patents describing a method of providing audio format professional continuing education information for payment comprising the basic steps of providing Audio Format Professional Continuing Education presented in topical categories, the information therein being prepared by said information provider to keep said client current, (aware and informed of developments), in the topical category, (as opposed to train said client to overcome a specific identified documented professional competency deficiency), and that the Client selects, verifies or provides payment for the right to access, and then accesses a topical category at least twice, wherein an updating of audio format information presented in said topical category is tended to by the information provider, between at least two of said Client accessings. An additional step includes said Client providing acknowledgement to the information provider that he or she has received the information. This can take the form of filling out a brief questionnaire, typically provided in text as opposed to audio, format, which in combination with the attestation documents that the Client has listen-to-grasped the information accessed.

A need is thus identified for a method of providing audio format professional continuing education information for payment, to clients, to keep clients aware and informed of developments in at least one topical category. The invention disclosed herein provides such a method.

DISCLOSURE OF THE INVENTION

The presently disclosed invention is a method of providing audio format periodically updated professional continuing education to clients for payment, to keep clients aware and informed of developments in at least one topical category, comprising the steps of:

a. an information provider providing an internet web site;

b. said information provider making audio format professional continuing education information available from audio information format machine readable storage via said web site, in topical categories;

c. making access to said audio format professional continuing education information available via said web site to clients by a selection from the group consisting of:

periodic subscription; and direct pay per access event;

d. said information provider allowing at least one client to receive said audio format professional continuing education information via said web site by, using an internet accessing means, accessing said web site, and providing payment via a selection from the group consisting of:

proof of paid subscription; and presenting payment means;

and identifying a professional continuing education information topical category of interest, followed by said at least one paying client receiving audio format professional continuing education information in said topical category of interest;

said method typically further comprising:

e. said information provider updating the audio format professional continuing education information in the at least one client identified topical category of interest in step d, and said at least one paying client in step d repeating step d after said audio format professional continuing education information is updated, and receiving the updated audio format professional continuing education information in said identified topical category of interest;

said method typically being further characterized in that the information in said client identified and received audio format professional continuing education is prepared to keep said client aware and informed of developments in the topical category and thereby maintain professional currency therein, to the exclusion of being prepared to train said client to overcome a specific documented professional competency deficiency.

The method can further comprise the client downloading the information accessed onto a recording means such as magnetic media or writable compact disk to enable maintaining a permanent library record thereof.

The method can also further comprise the client forwarding the accessed information to other authorized fee paid recipient clients on a local network.

The method can further comprise the information provider continuing to make archived information available in topical categories, tagged with an identifying date, (eg. date of original availability or date first accessed by said client), and said client accessing said archived information by identifying both the topical category and said date of original availability. That is, for instance, a client could access information in steps d and e, and later reaccess information previously accessed in a practice of step d. The information can also be tagged with at least one key-word in addition to a time, and the method further involve entering said at least one key word to enable quicker access to specific content is said audio format professional continuing education.

Said method can further comprise the step of a client providing attestation of having received and grasped the information accessed to the information provider. This can take the form of said information provider making available a questionnaire, and a client filling-in said questionnaire and providing it to the information provider to provide proof he or she received and listened-to-grasped the information accessed. Said attestation and/or completed questionnaire is preferably provided to the information provider, and/or a Professional Licensing Bocy, via the internet accessing means. It is to be appreciated that the questionnaire indicated here is taken after the accessed information is received and listened-to-grasped by a client. This is distinguished over the Allison 230 Patent test which is taken prior to receiving information, the results of said Allison 230 test being used to guide selection of what course is to be accessed based on competency deficiencies identified by the results thereof. Specifically, the present invention information is audio format professional continuing education prepared to keep a client aware and informed of developments in a topical category and thereby maintain professional currency therein, rather than course material prepared to train a client to overcome a specific testing failure documented professional competency deficiency.

It is noted that the Audio format professional continuing education information can comprise journal summarys, interviews, expert commentary subscribing-client Hyde-Park and subscribing-client advertising.

In addition, live audio presentation in addition to audio information provided from audio format machine readable storage can also be provided.

Said method can further comprise said information provider producing supplemental written and/or other visual format materials and making them available to a video screen on said internet accessing means, simultaneous with providing audio format professional continuing education information.

A service can include the information provider providing to a client a citation to a source of more information regarding a topic, and said Client accessing said source, either over the internet accessing means or otherwise. This can take the form of the audio format professional continuing education information simply including the citation, or a Client might be provided the citation after it is requested from the information provider.

While not limiting, topical categories can be selected from the group consisting of:

law related areas of:
 patent, trademark, copyright, trade secret, computer, internet, unfair competition, high-tech, contract, tort, property, wills & trusts, criminal, evidence, constitutional, corporate, taxation, estate planning, securities, banking, bankruptcy, accounting, trade regulation, commodities, insurance, energy, environment and water, aviation, automobile, labor, social security, family, divorce, juvenile, workman's compensation, personal injury, product liability, employment practices, administrative, educational, mass communications, medical, farm, and military;

science, medical and technology related areas of:
 astronomy, architecture, mathematics/statistics, physics, chemistry, engineering (electrical/electronic, nuclear, mechanical, civil, chemical, biological, genomic, construction, transportation, industrial, manufacturing, agricultural, computer, energy, environmental), horticulture/forestry, geology, food science, nutrition, psychology, zoology, veterinary, medicine (anatomy, physiology, bio-chemistry, cardiology, renal, gastrointestinal, pulmonary, pathology, microbiology), pharmacy, nursing, Scientology/Dianetics; and specific approach to practice tips.

In is noted that the specific categorical examples provided are not to be taken to imply limitations, but rather any professional area is to be considered as included within the scope of the present invention. However, specifically not included is non-professional information such as generic news, summaries thereof, audio books and the like, which information is not categorized as being within a professional topical category. A good definition of topical information included within the disclosed invention can be arrived at by asking if the topical category is one in which practitioners of the underlining subject matter thereof are monitored by Professional Licensing Boards. If the answer is yes, the information probably is within the scope of the present invention.

A specific example of where the disclosed method might be very valuable involves the case where a Professional Licensing Body publishes information it requires its members to grasp. The information can be made available by the Professional Licensing Body as in a Topical Category. As members access the audio format professional continuing education information and receive and listen-to-grasp it, they can send affirmations of having done so to the Information Provider and/or Professional Licensing Body. Alternatively, the Information Provider and/or Professional Licensing Body can provide a test, typically in visual format but over the same communication via. The Professional will then document his or her grasp of the information by completing the test and sending it and/or results thereof to said Information Provider and/or Professional Licensing Body, typically over the same communication via.

Some areas of professional activity being more active than others at certain times, it might be required to update a category less often that another, and it might occur that a category will be updated irregularly, say every day, every week during some periods, and only, say, bi-weekly or monthly etc., during others.

Further the nature of the service would allow a Professional to quickly and precisely access areas of interest, including related areas. For instance, a practitioner in Securities Law might want to also listen to the Banking update, or a Patent Practitioner might want to listen to Computer and Internet areas. The service provider would, of course, be receptive to subscriber needs as regards establishing and supporting categories. Of course a similar categorization approach would apply to other areas, such as Science, Technology and Engineering.

The step of said information provider making information available to said web site which is categorized into topical professional categories can involve partnering or working closely with professional sources, and/or involve in-house gathering.

The step of making access to said web site available to accessors via a paid subscription can involve subscription achieved via on-line provision of information and identification of a payment means, (eg. credit or debit card), or via more traditional mail or fax means, with payment being by check, direct account debit, or again by identification of a payment means, (eg. credit or debit card). Where a paid subscription is the means of access, an authorization code, possibly combined with a PIN number, would be issued and access to information would be based upon a subscriber being able to provide such data when accessing the Web site. Where information is accessed on a per-use, non-subscription basis, payment can be by any functional means, (eg. credit or debit card or functional equivalent card payment), at the time the information is accessed.

The step of obtaining client subscribers can be approached by phone contact, sending materials via regular or e-mail etc. which contain access codes which enable a potential subscriber to access a limited number of audio format updates.

It is further disclosed that once authorized, any technically functional via to accessing the professional continuing education information, (including down-loading a file in compressed or in non-compressed form, or simply accessing, in real time, a Web-site server), is within the scope of the present invention. For instance, down-loading of compressed files might work very well for prepared taped audio update programming, but real-time access is required for call-in shows and for access to late breaking news.

It is to be understood that while the focus format in practicing said method of providing professional continuing education information for payment is audio, this does not exclude providing of supplemental written materials and/or utilization of visual format. And, where written or other visual format materials are downloaded, where they are obtained or derived from other sources, a fee can be paid to said other source by the information provider to encourage said other sources to work with the information provider. That is, the present invention information provider will primarily produce and market Categorized Audio Format Professional Programming, and preferably work with existing sources of printed and other visual format materials, on a compensated basis, to obtain information gathered thereby. And, where an outside provider supplies materials which are in audio format or are substantially directly transformed into an audio format with little modification being required, the information provider might also pay a royalty fee to said outside provider even where written and/or other visual format materials are not per se. downloaded by a client. However, developments in professional areas are typically found in print form available from other "original" sources, (eg. case law decisions, scientific journals etc.), hence, the information provider making printed materials available has only limited application.

It is noted in passing that potential outside sources of information in the Legal arena include such as the on-line operations LEXIS & NEXIS, and legal publishers such as the Thompson Group, the Bureau of National Affairs, (BNA); Matthew Bender; the Practicing Law Institute, (PLI); Aspen Publishing etc.

It is further contemplated that some described services might be provided to the public without fee, but that continuing professional education audio updates would typically be available only for a fee. It is also noted that many States require professionals complete continuing education requirement each year. Information provided over the internet can be structured so as to gain acceptance by said States, to allow meeting said continuing education requirements. Hence additional steps in the methodology of the present invention can include developing programming and obtaining approval from State authorities to the end that Clients can be awarded required credit by accessing the audio format periodically updated professional continuing education over the internet.

It is further noted that said client, while listening to said audio format professional continuing education, can tend to other tasks not requiring of listening. The audio format of the informaiton allows "multi-tasking" which is not possible if the client relies on reading printed materials to stay current.

The present invention will be better understood by reference to the Detailed Description Section of this Specification, in conjunction with the Drawings.

SUMMARY OF THE INVENTION

It is therefore a primary objective and/or purpose of the present invention to teach a method of keeping professionals aware and informed of developments in a primarily audio format, easily accessed categorized topical areas of interest, on a for-payment basis, utilizing the Internet as distribution means.

It is another objective and/or purpose of the present invention to teach payment for said for-payment basis accessed information can be via periodic subscription, and/or via direct pay per access event.

It is yet another objective and/or purpose of the present invention to teach preparation of audio format professional educational programming involving the information provider paying outside sources of written and/or other visual format materials a fee, and/or royalty.

It is another objective and/or purpose yet of the present invention to teach affirmation of having listened-to-grasped accessed audio format professional educational information by a client, which is sent to the information provider and/or a Professional Licensing Body.

It is another objective and/or purpose of the present invention to teach that a client download information accessed onto a recording means such as magnetic media or writable compact disk to enable maintaining a permanent record thereof for future reference.

It is another objective and/or purpose yet of the present invention to teach client testing by way of tests provided by the information provider after said client has identified a topical category of information and accessed and listened-to-grasped the information provided, which completed test or results thereof is sent to the information provider and/or a Professional Licensing Body.

Other objectives and/or purposes of the present invention will become apparent from a reading of the Specification and Claims.

DETAILED DESCRIPTION

Figure 1:
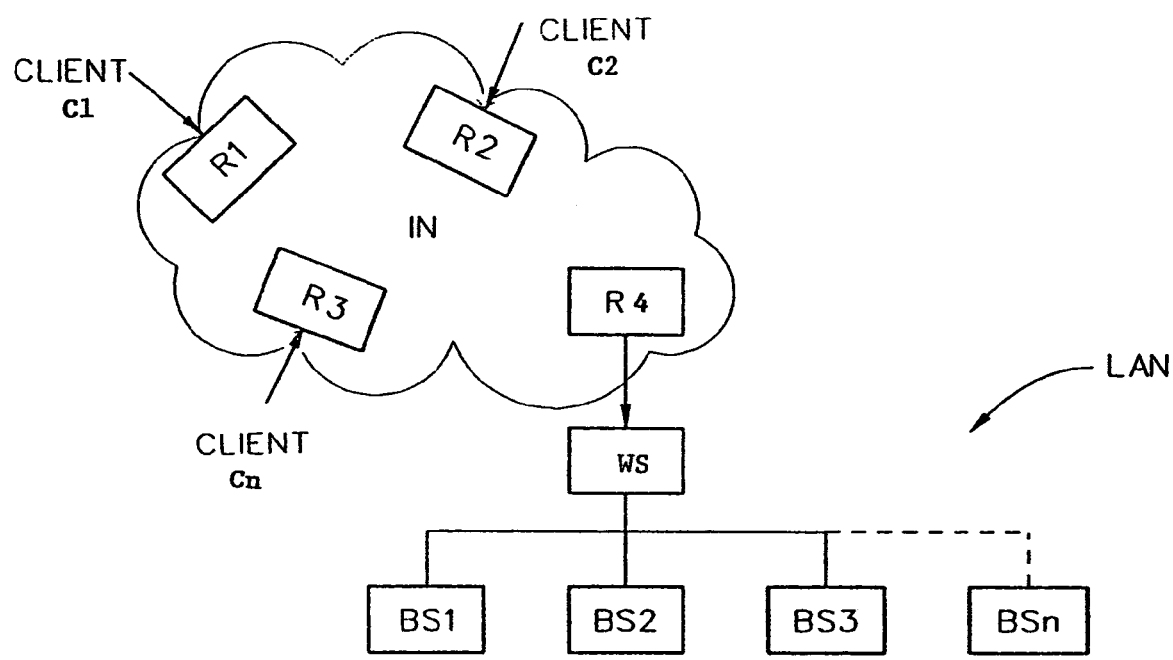
FIG. 1 shows a diagrammatic representation of the Internet with a plurality of Clients obtaining access thereto via Routers, said Clients accessing a web site.

Turning now to the Drawings, FIG. 1 shows a non-limiting diagrammatic representation of the Internet (IN) with a plurality of Clients (C1)-(CN) obtaining access thereto via Routers (R1)-(R3). The disclosed invention provides that said Clients access Website (WS). Said Website (WS) provides access, via Local Area Network (LAN) to a multiplicity of Servers (BS1)-(BSn). The Website (WS) can be considered to be a Dispatcher in the (LAN). Said FIG. 1 demonstrates a model of a system which the present invention can utilize, wherein the Website (WS) represents the information provider established internet web site, and wherein the Servers represent storage media depositories of various categorized topical professional information categories. In use a Client calls-up the Website (WS), and provides identification thereto of what information category it is wished to access. The Website (WS), acting as Dispatcher, provides the Client access to the appropriate Server (BS1)-(BSN), which responds to the Client, typically, but not necessarily, through the Website (WS) as Dispatcher. Of course, FIG. 1 is only demonstrative and not limiting of a system with which the present invention method can be practiced.

Figure 2:
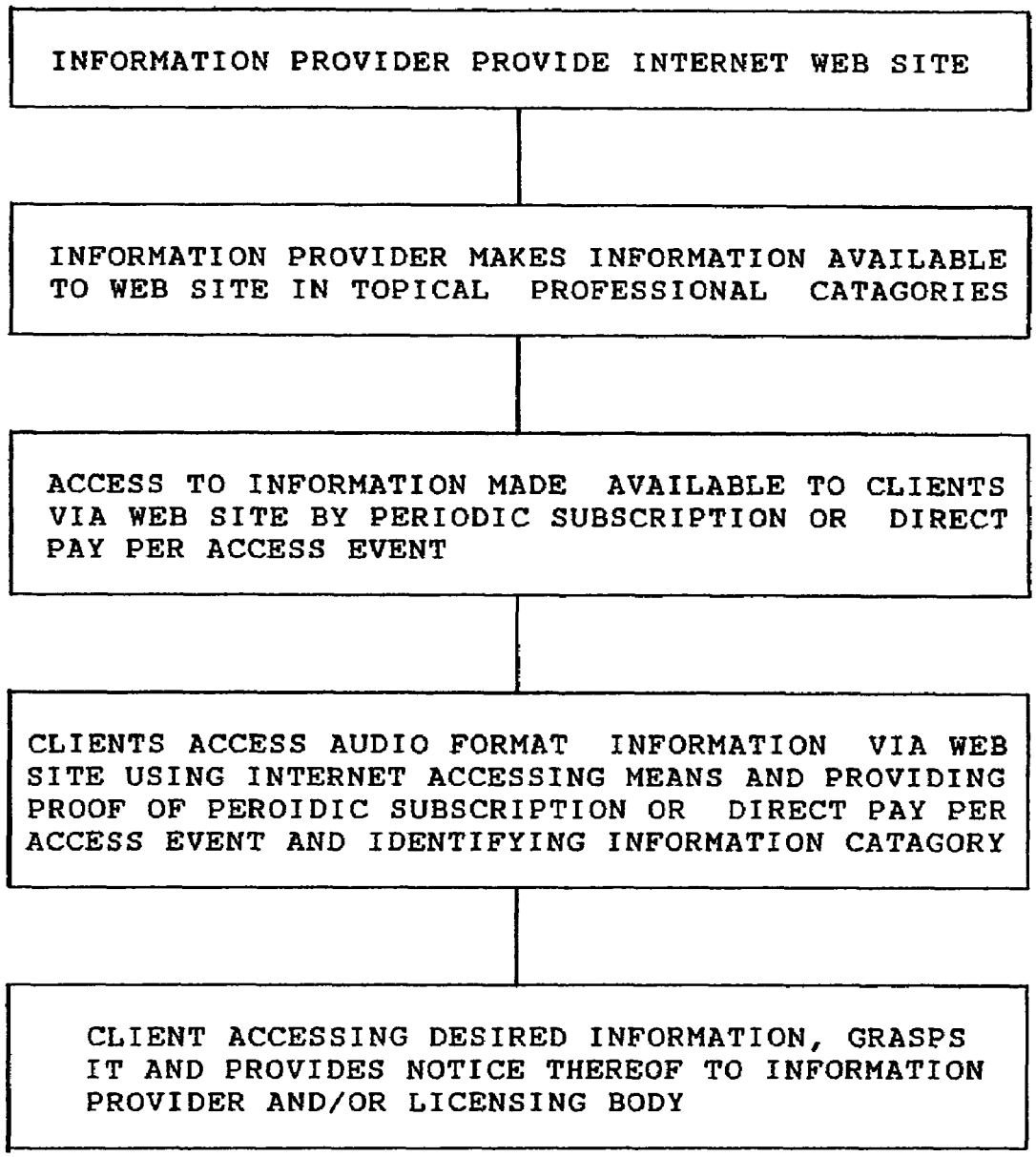
FIG. 2 shows a Flow Chart of steps of the basic Method of the present invention.

FIG. 2 shows a Flow Chart of steps of the basic Method of the present invention. The initial step indicates an information provider establishes an internet web site. The second step provides that said information provider makes information available via said web site in topical professional categories. The third step provides making access to information available via said web site available to Clients by a selection from the group consisting of: (periodic subscription; and direct pay per access event). The forth step involves allowing Clients to receive audio format information via said web site by, using an internet accessing means, accessing said web site, and providing a selection from the group consisting of:

proof of paid subscription; and presenting payment means (eg. presenting a credit or debit card or functional equivalent, accompanied by identifying an information category of interest. Said method, of course, further comprising said Client receiving the identified information in said category of interest. The preferred approach is to obtain Clients as subscribers and provide said subscribing Clients access information.

Figure 3:
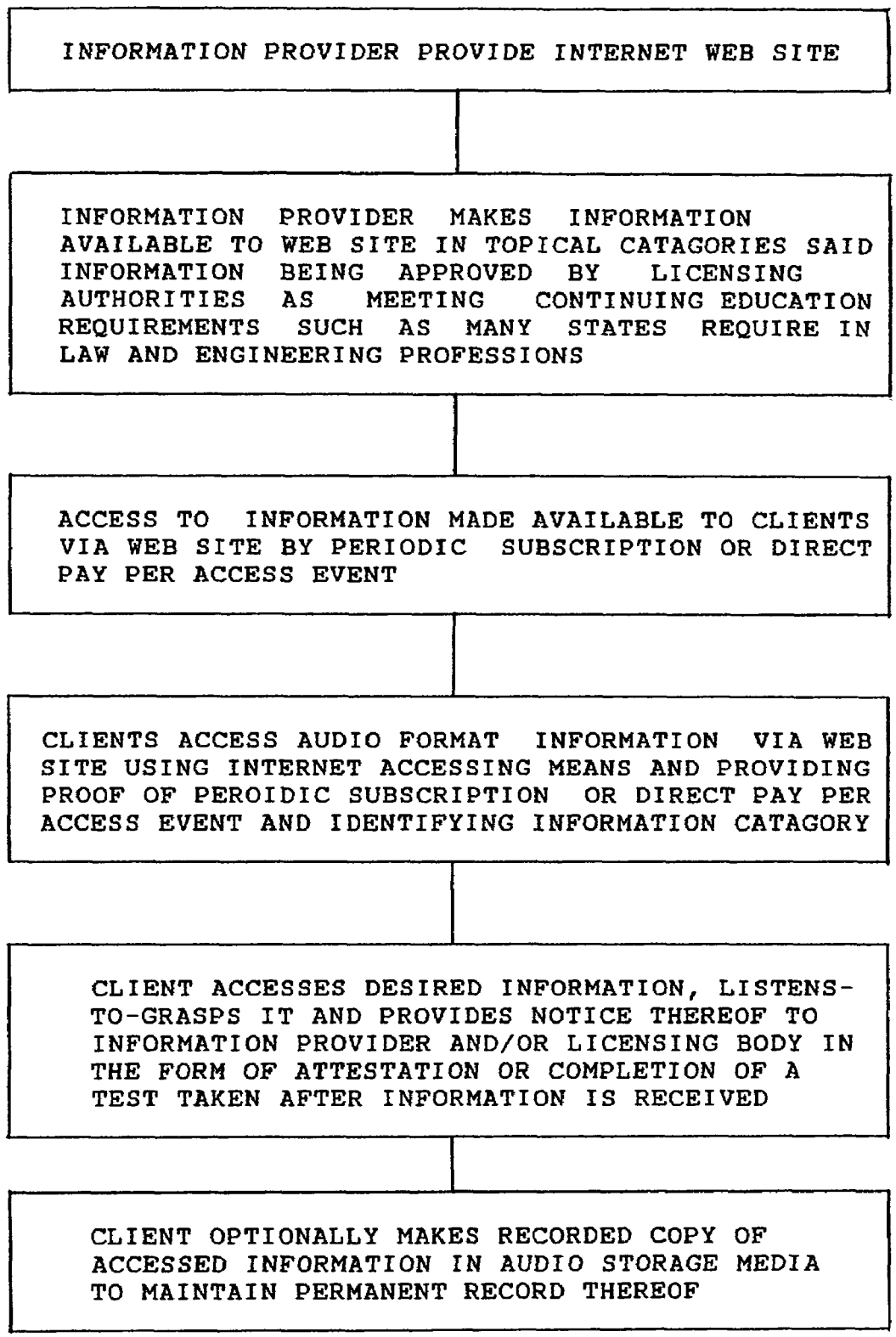
FIG. 3 shows a Flow Chart of steps of a Method of the present invention as it applies to providing for-credit professional courses over the internet.

FIG. 3 shows a Flow Chart of steps of a Method of the present invention. Said method is similar to that shown in FIG. 2, but includes documenting the client accessing and listen-to-grasping of the professional information over the internet. Said documentation can be obtained via client attestation, or completion of a test taken after receipt of the information and communicating such to the information provider and/or a Professional Licensing Body. Also indicated is that a client can download the audio information accessed onto a recording means to enable maintaining a permanent record thereof. It is valuable to have continued access to information which was available, but which is not longer available over the internet because the information has been updated.

As insight, the Internet can be visualized as a network which allows clients to access machine readable storage associated servers via means which include routers and dispatchers. It can be considered as being comprised of multiple "Layers":

LAYER 1—PHYSICAL (CONNECTION MEANS—EG. WIRES);

LAYER 2—DATA LINK (EG. A LOCAL AREA NETWORK (LAN)), (IE. MEDIUM ACCESS CONTROL (MAC) HEADER ADDRESSING);

LAYER 3—NETWORK, (IE. INTERNET PROTOCOL (IP) HEADER ADDRESSING);

LAYER 4—TRANSPORT, (IE. TRANSMISSION CONTROL PROTOCOL (TCP) HEADER ADDRESSING).

In use, a Client provides a request, information containing, packet, a (TCP) packet frame header address is amended thereto at Layer 4; an Internet Protocol (IP) packet frame header address is amended thereto at Layer 3; and a (MAC) packet frame header address is amended at layer 2. Said addressing serves to direct the request packet to its intended destination Web site.

It is also noted that Web servers use Hyper-Text-Transfer-Protocol (HTTP) which uses (TCP) as a transport layer, and that (HTTP) protocol is generally very simple. Under (HTTP) a Client establishes a connection to a server and issues a request. The server responds by processing the request, returning a response and closing the connection.

Additionally, to increase the simultaneous availability of Servers to Clients, the technique of Clustering is often utilized. Clustering involves, for instance, formation of a Local Area Network (LAN) wherein many Back-end Servers (BSN) are directed Client request packets via a Dispatcher, which Dispatcher has an Internet Address common to all said Back-end Servers thereby making access thereto effectively Client "transparent". The Server storage media depositories can be of any functional type, but typically comprise read/write magnetic media. (It is noted that this Specification generally considers that Servers functionally include machine readable storage).

It is to be understood that the terminology "information provider" is to be interpreted broadly to include any entity, either alone or where functionally in combination with other entities, that establish such as an internet web site and makes audio format professional information available there-via, in topical categories.

Further, the terminology "web site" is to be interpreted broadly to include any Client accessible address on the Internet, and/or otherwise over communication, (eg. Telephony), lines.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A method of accessing audio formatted content from an information provider's website server by one or more user computers to receive professional continuing education information comprising the steps of:

a) accessing the information provider's website sever by one or more user computers connected to the server by a computer network, wherein the network is the internet;

b) selecting by a user audio formatted content organized at the website by topical categories, wherein the topical categories are specific to maintaining professional currency;

c) selecting by the user a payment from the group consisting of periodic subscription and pay per access event;

d) accessing the selected audio formatted content from the website server by the user computer subsequent to the user selecting from the group consisting of: providing proof of paid subscription and making payment, wherein the selected audio formatted content is tagged with time information and wherein the selected audio formatted content by the user is updated at the website server between at least two accesses by the user of the selected audio formatted content; and e) sending a notice to the website server and/or a licensing body computer by the user acknowledgement of audio delivery of the received audio formatted content, wherein the notice provides attestation of completion or provides a completed questionnaire.

2. The method of claim 1, wherein the audio formatted content comprises a journal summary.

3. The method of claim 1, wherein the audio formatted content further comprises a live audio presentation.

4. The method of claim 1, wherein the audio formatted content comprises selection from the group consisting of: an interview; expert commentary; subscribing-client Hyde-Park; and subscribing-client advertising programming.

5. The method of claim 1, wherein the user receives at the user's computer supplemental text and/or visually formatted content simultaneously with the audio formatted content.

6. The method of claim 1, wherein the website server delivers to the user's computer a citation to a source of additional information regarding a topic.

7. The method of claim 1, wherein the topical categories are selected from the group consisting of:

- law related areas of: patent, trademark, copyright, trade secret, computer, internet, unfair competition, high-tech, contract, tort, property, wills & trusts, criminal, evidence, constitutional, corporate, taxation, estate planning, securities, banking, bankruptcy, accounting, trade regulation, commodities, insurance, energy, environment and water, aviation, automobile, labor, social security, family, divorce, juvenile, workman's compensation, personal injury, product liability, employment practices, administrative, educational, mass communications, medical, farm, and military;
- science, medical and technology related areas of: astronomy, architecture, mathematics/statistics, physics, chemistry, engineering (electrical/electronic, nuclear, mechanical, civil, chemical, biological, genomic, construction, transportation, industrial, manufacturing, agricultural, computer, energy, environmental), horticulture/forestry, geology, food science, nutrition, psychology, zoology, veterinary, medicine (anatomy, physiology, biochemistry, cardiology, renal, gastrointestinal, pulmonary, pathology, microbiology), pharmacy, nursing, Scientology/Dianetics; and
- specific approach to practice tips.

8. The method of claim 1, further comprises step f): re-accessing previously accessed time tagged audio formatted content by one or more user computers.

9. The method of claim 1, which further comprises step f): tagging audio formatted content with at least one keyword and one or more user computers re-accessing previously accessed information based partly thereupon.

10. The method of claim 1, which further comprises step f): recording selected audio formatted content in machine readable media by the one or more user computers.

* * * * *